United States Patent [19]

Hulsebosch et al.

[11] Patent Number: 5,490,137
[45] Date of Patent: Feb. 6, 1996

[54] METHOD OF ALLOCATING A NEW FREQUENCY PLAN IN A COMMUNICATION SYSTEM

[75] Inventors: Thomas G. Hulsebosch, Palatine, Ill.; Bruce Duysen, Southlake, Tex.

[73] Assignee: Motorola, Inc., Schaumburg, Ill.

[21] Appl. No.: 285,573

[22] Filed: Aug. 3, 1994

[51] Int. Cl.$^6$ ............................... H04J 3/16; H04L 5/14; H04B 7/212

[52] U.S. Cl. ..................... 370/29; 370/95.3; 455/33.2; 379/60

[58] Field of Search ................... 370/16, 50, 14, 370/95.1–95.3, 85.7, 29; 455/34.1, 34.2, 33.1, 33.2, 32.1, 62, 54.1, 54.2; 379/59, 60; 375/202, 203

[56] References Cited

U.S. PATENT DOCUMENTS

| | | | |
|---|---|---|---|
| 5,034,993 | 7/1991 | Sasuta et al. | 455/34.1 |
| 5,111,534 | 5/1992 | Benner | 455/33.2 |
| 5,119,397 | 6/1992 | Dahlin et al. | 455/32.1 |
| 5,293,641 | 3/1994 | Kallin et al. | 455/33.1 |

OTHER PUBLICATIONS

"European Digital Cellular Telecommunication System (Phase 2); Multiplexing and Multiple Access on the Radio Path", European Teleommunications Standards Institute, GSM 05.02, Version 4.3.0, Jul., 1993, pp. 1–33.

*Primary Examiner*—Wellington Chin
*Assistant Examiner*—Ajit Patel
*Attorney, Agent, or Firm*—Jeffrey G. Toler; Raymond J. Warren

[57] ABSTRACT

A new frequency plan is allocated in a communication system by first comparing (30) the channels in the old frequency plan with the channels in the new frequency plan to identify any problem channels that may exist (31). The system then attempts to clear any problem channels by reassigning (14) mobile stations, that may be currently assigned to those problem channels, to channels common to the old and new frequency plans, first non-problem channels. The new frequency plan is then implemented (15) by activating any new channels that are not active under the old frequency plan and deactivating any old channels that are not a part of the new frequency plan and are not currently assigned. Any remaining mobile stations still assigned to problem channels are then reassigned (17) within the new frequency plan and the problem channels are then de-allocated.

15 Claims, 4 Drawing Sheets

METHOD OF ALLOCATING A NEW FREQUENCY PLAN IN A COMMUNICATION SYSTEM

FIELD OF THE INVENTION

The invention relates, in general, to communication systems and, in particular, to a method of allocating a new frequency plan in a communication system.

BACKGROUND OF THE INVENTION

Presently in communication systems, particularly cellular communication systems, it is necessary to change the frequency plan from time-to-time. This need arises from a variety of circumstances such as capacity needs during particular times of day or the redesign of a system through the placement of additional cell sites.

The current methods of changing a frequency plan require either that part of the system be shut down or results in substantial interference during the transition from the old to the new frequency plan. One present method of accomplishing an allocation of a new frequency plan consists of allocating the new frequencies and locking out the old frequencies once calls are completed. This results in calls handled on old frequencies interfering with calls being handled on new frequencies in the same or adjacent cells during the overlap time.

Another method of changing a frequency plan is performed in the GSM (Groupe Spécial Mobile currently known as Global System for Mobile communications). In GSM, timing is established for transitioning a mobile station from one channel to a new channel. This is possible in GSM because of the use of superframes which are numbered and allow more precise timing between the BTS (Base Transceiver Station) and the mobile station. At the designated frame number, the system hands-off the communication unit from an old frequency to a new frequency. This capability can be used to help minimize the transitional period while the system is going from the old to the new frequency plan.

However other cellular communication protocols do not provide for frame numbering (which provides the capability of synchronizing the transfer of mobiles from the old set of channels to the new set) and do not have the timing accuracy utilized in GSM. TDMA (Time Division Multiple Access) systems such as EIA/TIA IS-54 (Electronics Industry Association/Telecommunications Industry Association Interim Standard 54), Japan's PDC (Personal Digital Cellular) system, described in RCR 27 (Research and development Center for Radio standard 27), and various analog systems, such as the EIA/TIA standard 553, do not have such a timing equivalent. Therefore, it is necessary to develop a process by which frequency plans can be changed in a manner resulting in reduced impact on the system and system users.

It should be noted that the use of the term frequency plan herein is the currently accepted designation which describes the set of channels used for communication with the mobile stations. I will be understood by those of skill in the art that frequency plans will also relate to time slot allocations, as well as identifying signals such as SAT (Supervisory Audio Tone), DVCC (Digital Verification Channel Code), etc.

SUMMARY OF THE INVENTION

A method is described of allocating a new frequency plan in a communication system which first compares the channels in the old frequency plan with the channels in the new frequency plan to identify any problem channels that may exist. The system then attempts to clear any problem channels by reassigning mobile stations that may be currently assigned to those problem channels to non-problem channels (e.g. channels in the old frequency plan which is also a channel in the new frequency plan). The new frequency plan is then implemented by activating any new channels that are not active under the old frequency plan and deactivating any old channels that are not a part of the new frequency plan and are not currently assigned. Any remaining mobile stations assigned to problem channels are then reassigned within the new frequency plan and the problem channels are then de-allocated from that cell.

DETAILED DESCRIPTION OF THE DRAWINGS

Figure 1:
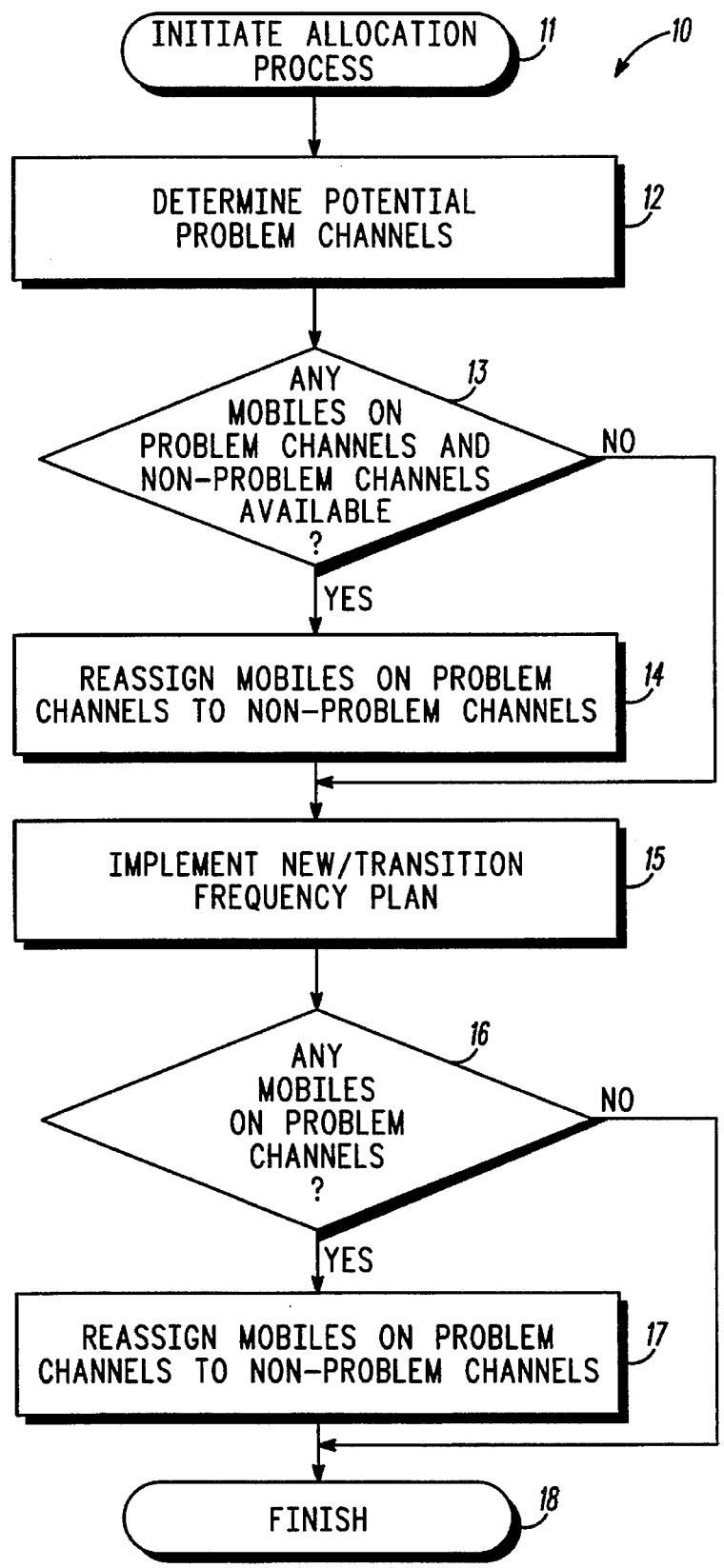
FIG. 1 is a flow chart representing a method embodying the present invention.

Referring initially to FIG. 1, a flow chart representing a method, generally designated 10, embodying the present invention is illustrated. Method 10 begins with the initiation of the allocation process, step 11, and proceeds to determine whether any potential problem channels exist, subprocess 12. A problem channel is defined, for the purposes of this description, as a communication channel in the set of the old frequency plan which is not in the set of the new frequency plan. A set of first non-problem channels is one which contains a set of channels common to both the new and old frequency plans. A set of second non-problem channels are channels in the new frequency plan that are not in the old frequency plan.

If a communication unit is on problem channel and a first non-problem channel is available, decision step 13, then a mobile station currently assigned to a problem channel is reassigned to a first non-problem channel, step 14, prior to changing frequency plans. These hand-offs can be made without creating any additional interference since the frequency plan has not yet been changed.

Figure 2:
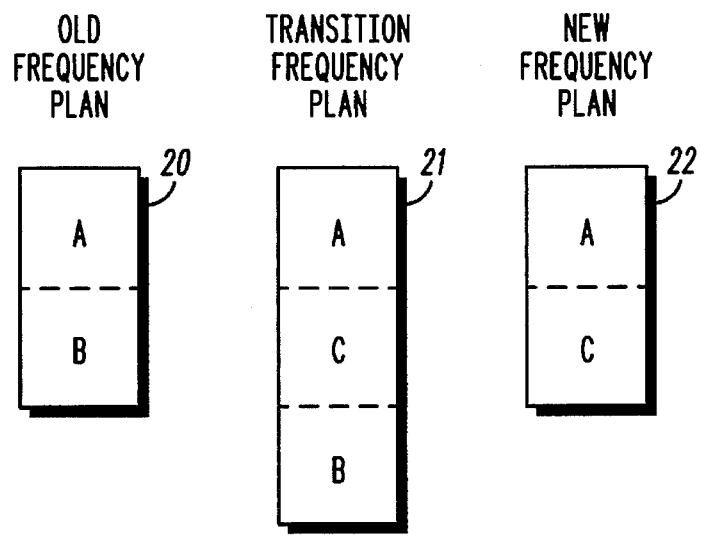
FIG. 2 is a block diagram representing a frequency transition plan.

Following step 14, or if a first non-problem channel is not available or if there is not a communication unit on a problem channel, decision step 13, then the system implements the new frequency plan, step 15. Process 10 then determines if there are still communication units on problem channels, decision step 16. If there are mobiles still assigned to problem channels, then the system is, in effect, in a transitional frequency plan is illustrated in FIG. 2. In FIG. 2 a first block 20, representing the old frequency plan is illustrated as having channels A, which represents first non-problem channels (since these are also in the new plan), and B, which represents problem channels (since these are not in the new plan). The new frequency plan is represented as having channels A (first non-problem channels) and channels C (second non-problem channels). In order to transition from the old frequency plan to the new frequency plan, a transitional plan 21, is utilized. Transitional plan 21 consists of channels A and C from the new frequency plan and channels B', which is a subset of channels B, from the old frequency plan. The channels in B', are those that were in use at the time of transition and were unable to be assigned to a first non-problem channel.

Returning now to FIG. 1, once the transitional frequency plan has been established, the remaining mobile stations that are assigned to problem channels (B') are reassigned to second non-problem channels (C), step 17. Following step 17, or if there were no mobiles on problem channels at decision step 16, process 10 finishes, step 18.

Figure 3:
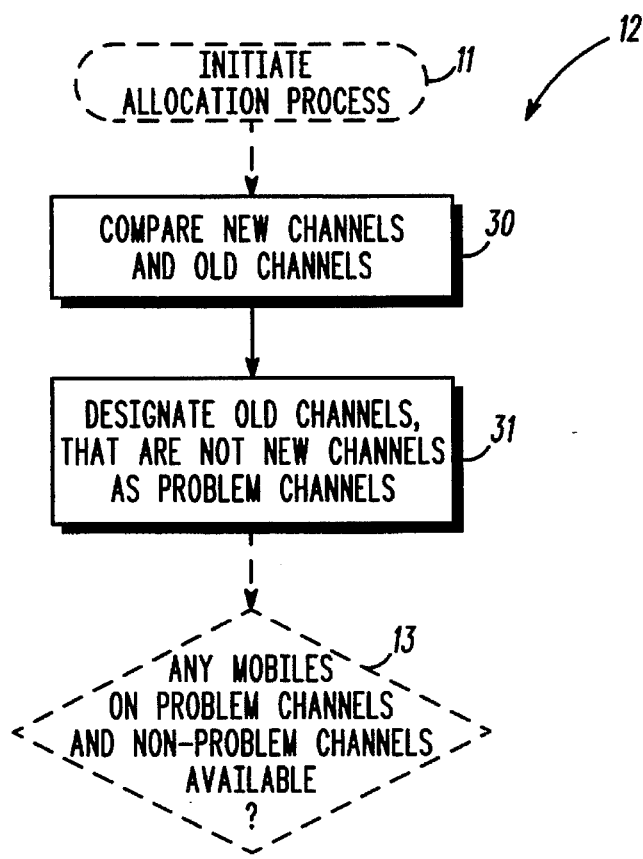
FIG. 3 is a flow chart representing a subprocess contained in FIG. 1.

Referring now to FIG. 3, a more detailed block diagram of subprocess 12 is illustrated. Subprocess 12 consists of two steps. First, the new channels in the new frequency plan are compared with the old channels in the old frequency plan, step 30. The old channels that are not in the new frequency plan are then designated as problem channels. Process 10 then continues with decision step 13, FIG. 1.

Figure 4:
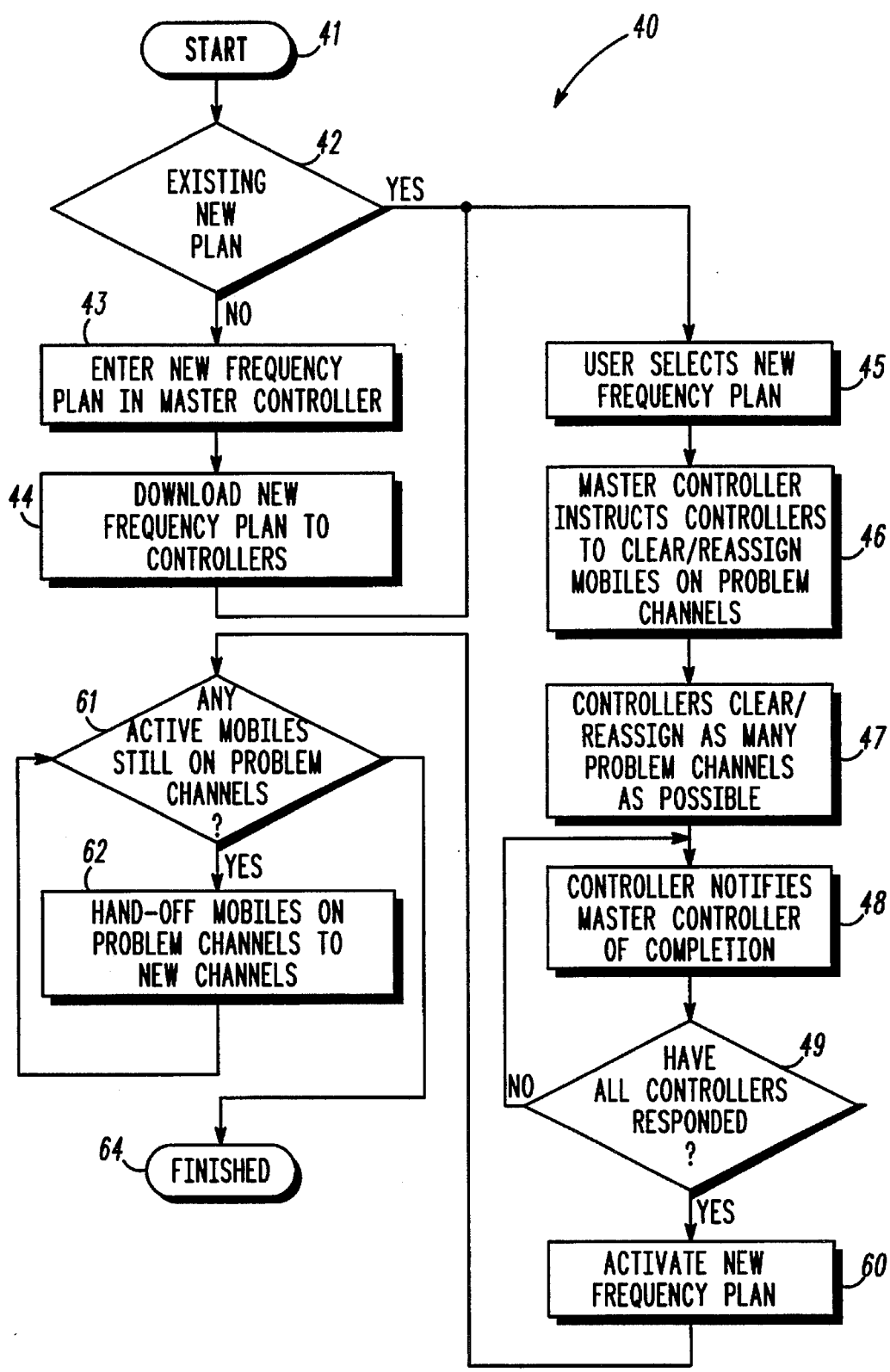
FIG. 4 is a flow chart representing a detailed method embodying the present invention.
Figure 5:
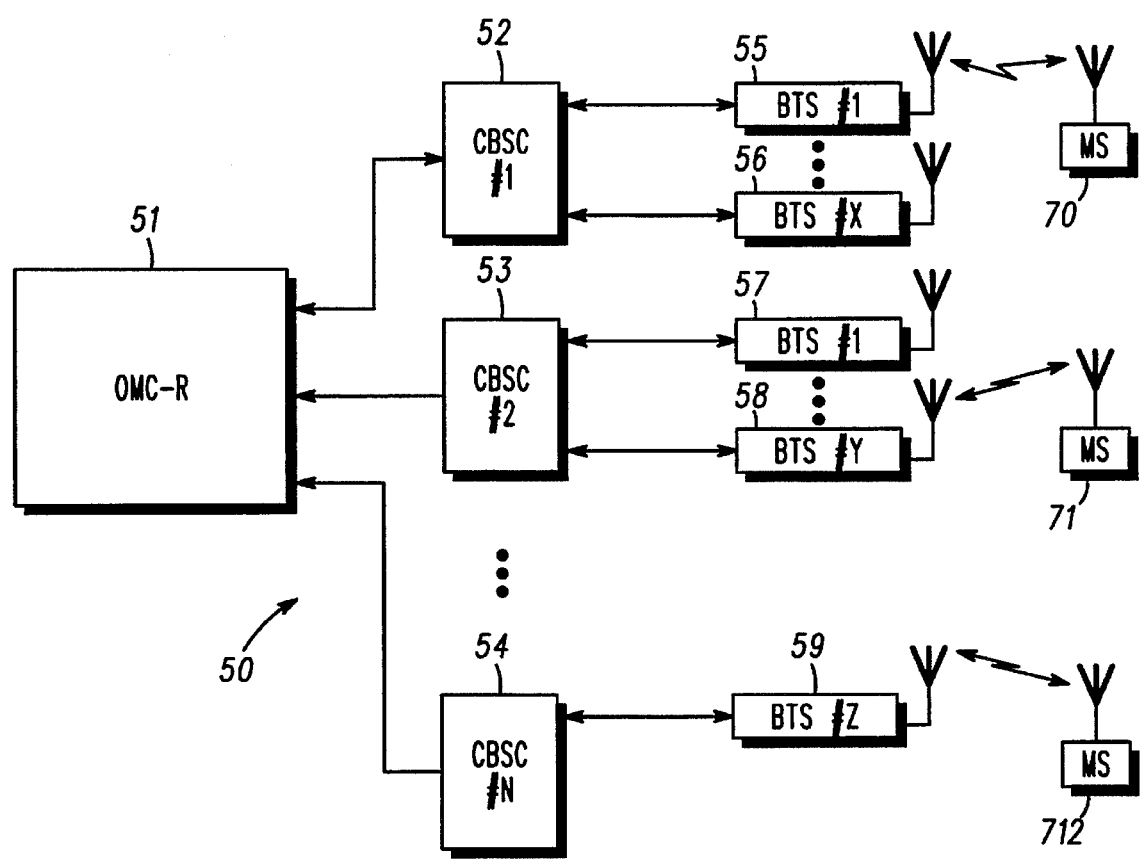
FIG. 5 is a block diagram representing a communication system utilizing the present invention.

Referring now to FIG. 4, a more detailed specific embodiment of the invention is illustrated and described below with reference to a block system diagram 50 of FIG. 5. System 50 is generally envisioned as a TDMA or analog type of system, but will also provide a benefit in any type of TDD (Time Division Duplex) systems. In FIG. 4, a method generally designated 40 is used to illustrate the present invention. Process 40 begins at step 41 when a new frequency plan is to be implemented. It is first determined whether the new plan currently resides in a master controller, decision step 42. In the system illustrated in FIG. 5, the master controller is OMC-R (Operation and Maintenance Center - Radio) 51. If the new plan does not currently exist in the master controller, one is entered, step 43. The new frequency plan is then downloaded to each of a plurality of controllers, step 44, such as CBSCs (Centralized Base Site Controllers) 52–54.

Once the desired new frequency plan is stored in the controllers, it may be selected by the user, step 45, to be implemented by the system. Once a new frequency plan is selected, master controller 51 instructs the plurality of controllers 52–54 to reassign specific problem channels, step 46. The controllers 52–54 then operate to reassign as many of the communication units 70–72 that are assigned to problem channels as possible, step 47. Controllers 52–54 then respond with a message to master controller 51 indicating that they have attempted to reassign all communication units currently assigned to a problem channel, step 48. The master controller 51 will wait until a response is received from each controller 52–54, step 49.

Once master controller 51 has received all of the responses, it will direct controllers 52–54 to activate the new frequency plan, step 60. This is accomplished by activating any new channels and deactivating old channels that are not in use. Controllers 52–54 then determine if there are any active mobiles on any of the BTSs (Base Transceiver Stations) 55–59 which are still assigned to a problem channel, decision step 61. If there are no communication units assigned to problem channels, then method 40 is complete, step 64. If there are still mobiles assigned to problem channels, then those mobiles are handed-off to a channel in the new frequency plan, step 62. The process then returns to decision step 61. This repeats until all of the mobiles on problem channels have been reassigned. Once all of the problem channels have been cleared, process 40 is completed, step 64.

This method provides a process by which a communication system can change frequency plans that does not require that the entire system be shut down. This is desirable by the operators and users in that neither desires to be without service. In addition, the present method provides a method that will minimize the amount of interference which results when something of this nature is performed while a system remains active. Further, the above process may be implemented in existing communication systems without requiring the addition of any new hardware, thereby minimizing its cost to the operator and end user.

The process described above will function in any type of current communication system. In particular TDMA and analog systems are envisioned for its use. In addition, any type of TDD system would also be able to take advantage of this process.

Thus, it will be apparent to one skilled in the art that there has been provided in accordance with the invention, a method of allocating a new frequency plan in a communication system which fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A method of allocating a new frequency plan in a communication system having an old frequency plan, said method comprising the steps of:

identifying a problem channel and a non-problem channel by comparing a channel in the new frequency plan with a channel in the old frequency plan;

reassigning a communication unit assigned to said problem channel to said non-problem channel and implementing said new frequency plan.

2. The method of claim 1 wherein said problem channel comprises a channel in said old frequency plan which is not in said new frequency plan.

3. The method of claim 1 wherein said non-problem channel comprises a channel in said new frequency plan which is not in said old frequency plan.

4. The method of claim 1 wherein said communication system consisting of one of a time division multiple access (TDMA) system and an analog system.

5. The method of claim 1 wherein said communication system is a time division duplex, TDD, system.

6. A method of allocating a new frequency plan in a communication system having an old frequency plan, said method comprising the steps of:

comparing a set of channels in said new frequency plan to a set of channels in said old frequency plan;

designating a channel which is in said new frequency plan and said old frequency plan as a first non-problem channel and a channel of said old frequency plan which is not in said new frequency plan as a problem channel;

reassigning a communication unit previously assigned to said problem channel to said first non-problem channel if said first non-problem channel is available;

implementing said new frequency plan; and reassigning said communication unit to a second non-problem channel in said new frequency plan if said communication unit is not reassigned to said first non-problem channel.

7. The method of claim 6 wherein said second non-problem channel comprises a channel in said new frequency plan which is not in said old frequency plan.

8. The method of claim 6 wherein said communication system consisting of one of a time division multiple access (TDMA) system and an analog system.

9. The method of claim 6 wherein said communication system is a time division duplex (TDD) system.

10. A method of allocating a new frequency plan in a communication system having an old frequency plan, said method comprising the steps of:
  (a) entering said new frequency plan into a master controller of said communication system;
  (b) downloading said new frequency plan to a plurality of controllers of said communication system;
  (c) selecting said new frequency plan to be implemented by said communication system;
  (d) directing said plurality of controllers to reassign a communication unit operating on a problem channel in said old frequency plan to a non-problem channel in said old frequency plan if said non-problem channel is available;
  (e) reassigning said communication unit operating on said problem channel to said non-problem channel if said non-problem channel is available;
  (f) notifying said master controller that attempted reassigning of said communication unit is completed;
  (g) directing said plurality of controllers to activate said new frequency plan;
  (h) determining if said communication unit is still assigned to said problem channel; and
  (i) directing a hand-off of said communication unit from said problem channel to an available non-problem channel of said new frequency plan.

11. The method of claim 10 wherein said problem channel is a channel of said old frequency plan that is not in said new frequency plan.

12. The method of claim 10 wherein said non-problem channel is a channel of said old frequency plan that is in said new frequency plan.

13. The method of claim 10 wherein said communication system comprising of one of a time division multiple access (TDMA) system and an analog system.

14. The method of claim 10 wherein said communication system is a time division duplex (TDD) system.

15. The method of claim 10 further comprising the step, prior to said step (g) of awaiting a notification from each of said plurality of controllers.

* * * * *